E. ERICKSON.
AUTOMATIC STOP MOTION.
APPLICATION FILED SEPT. 16, 1916.

1,224,456.

Patented May 1, 1917.
3 SHEETS—SHEET 2.

Inventor:
Edward Erickson,
by Walter E. Lombard,
Atty.

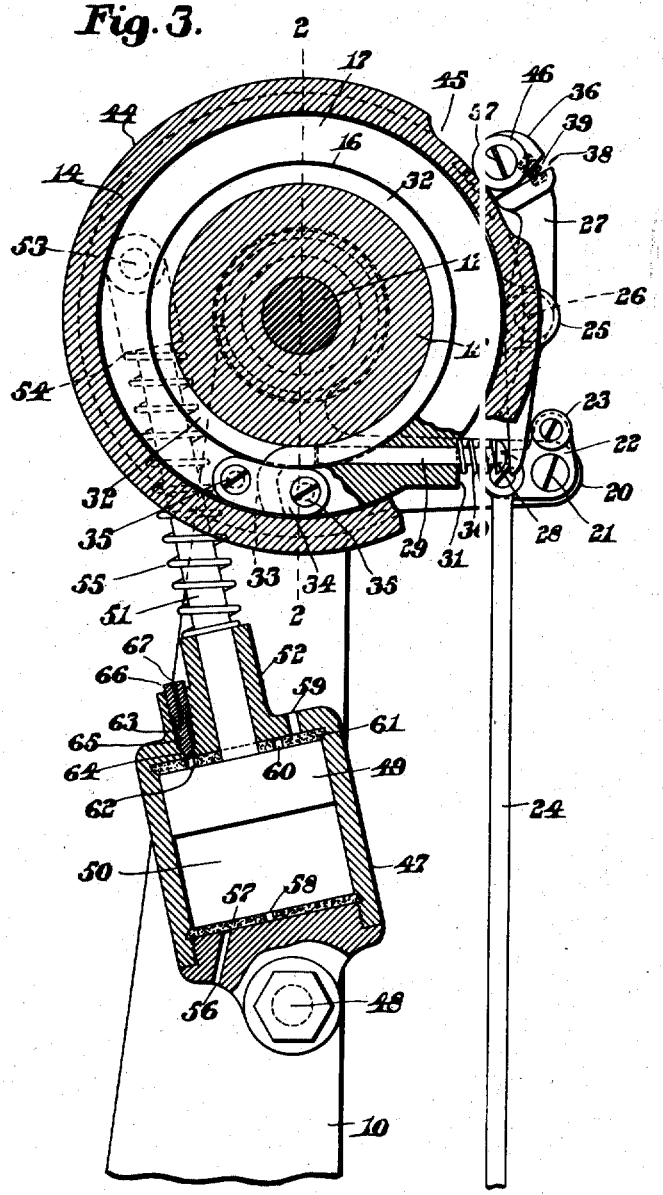

UNITED STATES PATENT OFFICE.

EDWARD ERICKSON, OF CLIFTONDALE, MASSACHUSETTS, ASSIGNOR TO VICTOR SHOE MACHINERY COMPANY, OF LYNN, MASSACHUSETTS, A CORPORATION OF MASSACHUSETTS.

AUTOMATIC STOP-MOTION.

1,224,456.   Specification of Letters Patent.   Patented May 1, 1917.

Application filed September 16, 1916. Serial No. 120,903.

*To all whom it may concern:*

Be it known that I, EDWARD ERICKSON, a subject of the King of Sweden, and a resident of Cliftondale, in the county of Essex and Commonwealth of Massachusetts, have invented certain new and useful Improvements in Automatic Stop-Motions, of which the following is a specification.

This invention relates to stop motions for power driven machines, and has for its object the provision of means whereby the machine may be stopped always at substantially the same point and without undue shock.

Another object of the invention is to provide a locking means whereby the operating parts will be locked from accidental movement, said locking means being under the control of the operator.

The invention consists in certain novel features of construction and arrangement of parts which will be fully understood by reference to the description of the drawings and to the claims hereinafter given.

For the purpose of illustrating the invention one preferred form thereof is illustrated in the drawing, this form having been found to give satisfactory and reliable results, although it is to be understood that the various instrumentalities of which the invention consists can be variously arranged and organized, and that the invention is not limited to the precise arrangement and organization of these instrumentalities as herein shown and described.

Of the drawings:

Fig. 3 represents a vertical section of the same on line 3—3 on Fig. 4, and

Similar characters designate like parts throughout the several figures of the drawings.

Figure 1:
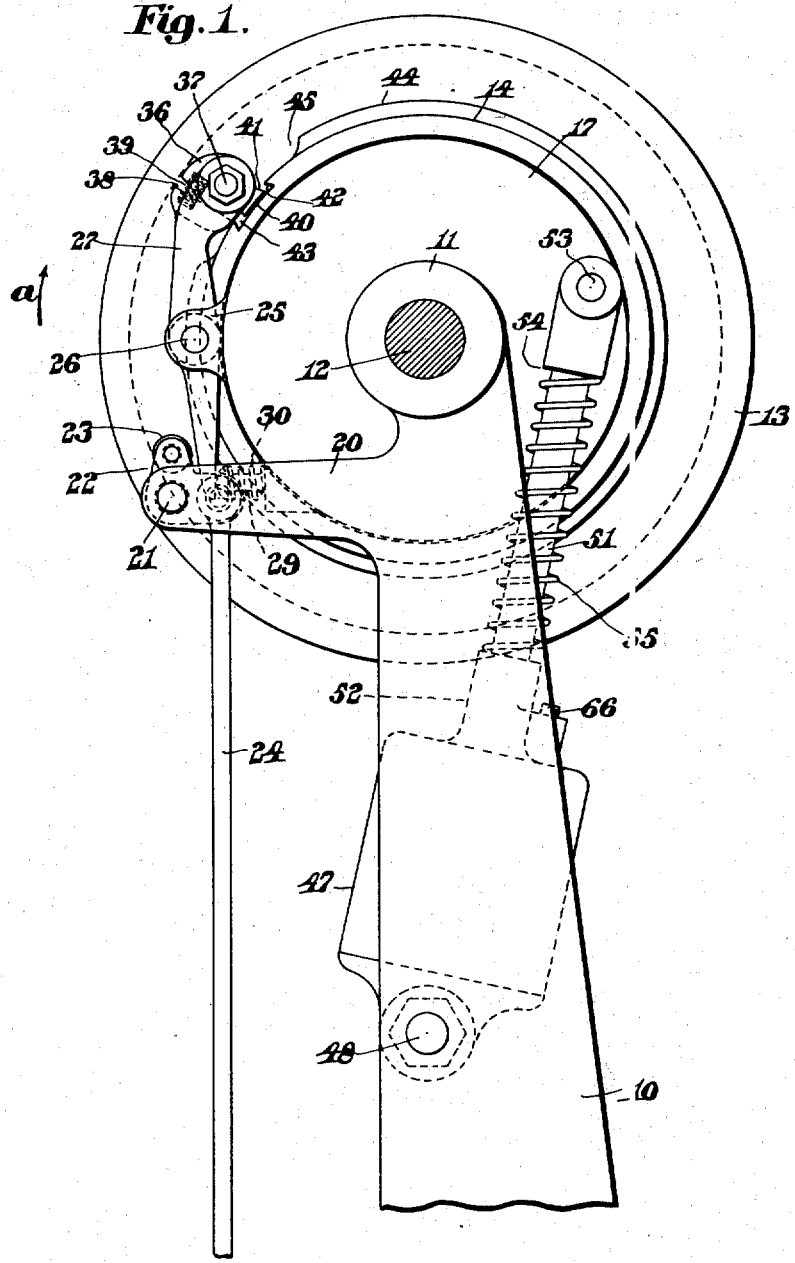
Figure 1 represents a vertical section of so much of a machine as is necessary to illustrate the present invention, the cutting plane being on line 1—1 on Fig. 4.
Figure 2:
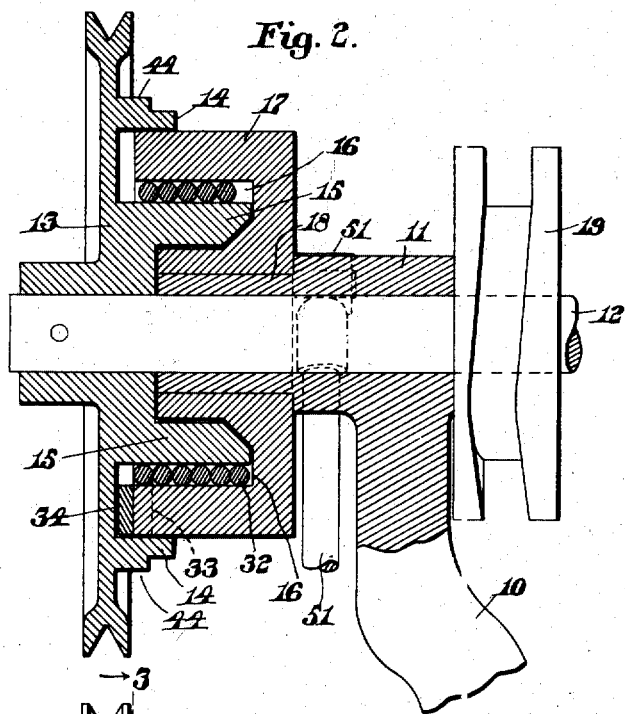
Fig. 2 represents a vertical section of the same on line 2—2 on Fig. 3.
Figure 4:
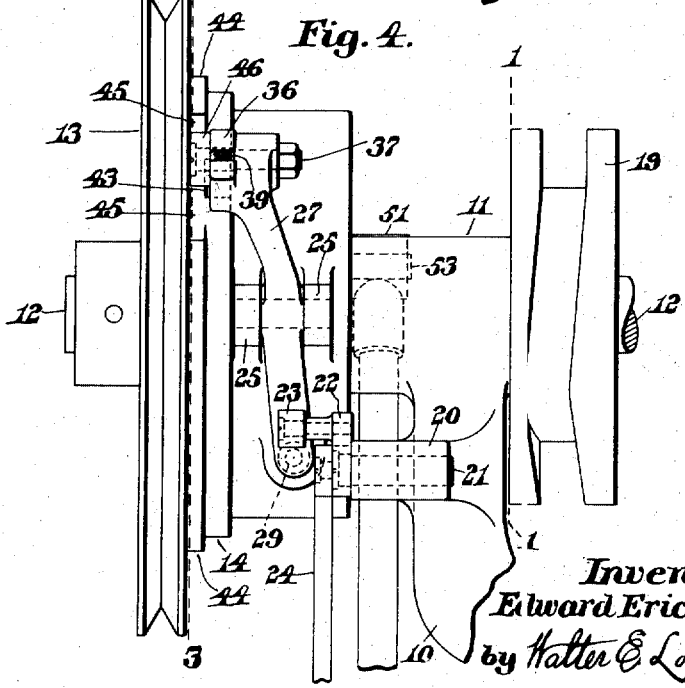
Fig. 4 represents an elevation of the upper portion of said mechanism.

In the drawings, 10 is a portion of the frame of a machine having at its upper end a bearing 11 in which is mounted a revoluble driving shaft 12. This shaft 12 has secured to one end a pulley 13 provided with an annular flange 14 and a cylindrical hub 15. The hub 15 extends into a chamber 16 in a cylindrical member 17 movable about the hub 15 forming a part of the bearing 11.

The shaft 12 has also secured thereto a cam 19 or some similar operating member. The frame 10 has an arm 20 extending laterally therefrom, to which is pivoted at 21 a bell crank lever 22, one arm of which has mounted therein a roller 23, while the other arm thereof has pivotally connected thereto a rod 24 extending to a foot treadle which may be of any usual construction, and is therefore not illustrated in the drawings.

To ears 25 extending from the periphery of the chambered member 17 is pivoted at 26 a lever 27, the lower end of which is in the same plane with the roller 23 so that when the treadle rod 24 is moved downwardly, the roller 23 will contact with the lever 27 and move it about its pivot 26. When the lever 27 is thus moved about the pivot, the lower arm thereof will contact with the head 28 of a pin 29 slidably mounted in the chambered member 17, said pin 29 normally being forced outwardly by means of the coiled spring or resilient member 30 interposed between the head 28 and the shoulder 31 formed upon the chambered member 17.

The inner end of the pin 29 is opposite to but free from contact with one end of a helical spring 32 surrounding the hub 15 of the driving member 13. The opposite end of the spring 32 is positioned in the slot 33 in the movable member 17, and is prevented from being displaced therefrom by means of the plate 34 secured to the member 17 by means of the screws 35. The helical spring 32 is formed in such a manner as to normally be in gripping contact with the periphery of the hub 15 and prevent the rotation of said hub and driving member.

It is obvious that when the lever 27 is moved about its pivot by means of the roller 23, the inner end of the slidable pin 29 will come into contact with the end of the helical spring 32 and expand it sufficiently to release the gripping contact thereof upon the hub 15 and permit of its rotation independently of the movable member 17. The upper end of the lever 27 has a block 36 pivoted thereto at 37. Between the block 36 and a shoulder 38 on the lever 27 is interposed a spring 39, the purpose of which will be hereinafter described. This block 36 has a projection 40 formed thereon, the end walls of which are inclined as indicated at 41 and are adapted to coact with the undercut walls 42 of a recess 43 formed in the flange 14 of the driving member 13.

The flange 14 is also provided with a raised track 44 having a depression 45 therein opposite to the recess 43. When the projection 40 is positioned within the recess 43 it is obvious that the driving member 13 and the movable member 17 are locked together and prevented from accidental rotation.

When it is desired to rotate the shaft 12 the operator places his foot upon the treadle and depresses the rod 24, thereby moving the lever 22 about its axis and forcing the lower arm of the lever 27 against the pin 29. The inward movement of the pin 29 releases the gripping contact of the helical spring 32 upon the periphery of the hub 15 and the belt upon the pulley 13 will then cause said pulley and the shaft 12 to be rotated in the direction of the arrow $a$ on Fig. 1 of the drawings. The inward movement of the lower arm of the lever 27 causes the upper arm thereof to be moved outwardly so that the projection 40 is disengaged from the locking recess 43, and as the cam member 14 rotates in the direction of the arrow $a$, the roller 46 at the upper end of the lever 27 rides up upon the raised track 44 and retains the projection 40 free from contact with the periphery of the flange 14.

During the operation of the machine the operator retains his foot upon the treadle. When the foot is removed from the treadle, the tendency of the spring 30 will be to force the pin 29 outwardly against the downwardly extending arm on the lever 27 and move the upper arm thereof so that the roller 46 will travel along the track 44 until it reaches the depression 45. The spring 30 will then cause the roller to move inwardly toward the axis of the shaft 12 and permit the projection 40 to enter the recess 43 and stop further rotation of the revoluble driving members. The block 36 is adapted to move slightly about the pivot 37 against the tension of the spring 39 when the projection 40 is passing into the recess 43.

To prevent any shock when the locking mechanism stops the further rotation of the driving members, a shock absorber is provided which consists of a dashpot 47 pivoted at 48 to the frame 10 and having a piston 49 slidably mounted within the chamber 50 formed therein. The piston 49 has a rod 51 extending through the upper end 52 of the dashpot 47. The upper end of the rod 51 is pivotally connected at 53 to the movable member 17. The shoulder 54 is formed on the upper end of the rod 51 and between this shoulder 54 and the upper end 52 of the dashpot 47 is interposed a spring 55, which tends to retain the piston 49 in the position indicated in Fig. 3 of the drawings at the upper end of the chamber 50. The lower end of the dashpot 47 is provided with a passage 56 normally closed by means of a disk valve 57 formed of leather or similar material and normally positioned against the lower end of the chamber 50, as indicated in Fig. 3. This disk valve 57 is provided with an opening 58 therethrough offset from the passage 56. The upper end of the dashpot 47 is similarly provided with the passage 59 offset from an opening 60 in a disk valve 61 normally bearing against the upper end of the chamber 50. When the piston 49 moves downwardly in the chamber 50 the valve disk 57 will be slightly cupped at the beginning of the movement of said piston and the air within the chamber will be forced through the opening 58, then between the valve disk 57 and the wall of said chamber to the passage 56, from which it may escape.

As the piston 49 approaches the lower end of the chamber 50 the disk 57 will be flattened as indicated in Fig. 3 of the drawings, and the passage 56 closed. When the chamber 49 is moved downwardly a suction will be created above the said piston which will cause the disk valve 61 to become cupped inwardly so that on the return movement of the piston the air within the chamber 50 will be forced through the opening 60 and passage 59.

This construction of shock absorber will effect an easy stopping of the driving mechanism always at a predetermined point in the cycle of rotation of the driving members so that the machine is always when at rest in condition to immediately start another operation as soon as the operator places his foot upon the treadle.

In order to more nicely adjust the discharge of the air from the chamber 50 during the upward movement of the piston 49, the disk valve 61 is provided with an opening 62 therethrough communicating with a passage 63 in the upper end of the dash pot 47. This passage 63 is provided with a cone-shaped valve seat 64 with which coacts the conical end of the reduced shank 65 of a member 66 threaded to the upper end of the dash pot 47. The passage 67 extends through the large end of the member 66 and communicates with the passage 63. By adjusting the member 66 any degree of opening of the valve may be provided.

The construction of the recess 43 and knockout projection 40 is such that when the foot is removed from the treadle and in the movement of the driving member 13 in the direction of the arrow $a$ the recess 43 reaches a point opposite said projection 40, said projection will immediately drop into said recess and permit the spring 32 to resume at once its normal position in gripping contact with the hub 15.

The member 17 will then become locked to the driving member 13 and both will move together in the direction of the arrow *a* against the tension of the spring 55 surrounding the piston rod 51.

As the piston 49 approaches the bottom of the chamber 50 of the dash pot 47, further movement of the members 13—17 will be gradually stopped, and the spring 55 will then return these members 13—17 to the position indicated in Fig. 3 of the drawings.

This return movement will be gradual, owing to the slow escape of the air in the dash pot 47 above the piston 49 through the discharge passages 60—59 and 62—63—67.

By means of this device the driving members may always be brought to a final stop at the same point and without any jar or shock to the various instrumentalities.

It is believed that the operation and many advantages of this invention will be fully understood from the foregoing description.

Having thus described my invention, I claim:

1. In a device of the class described, the combination of a driving shaft; a pulley secured thereto and provided with a cylindrical hub; a movable member having a chamber to receive said hub; a helical spring in said chamber and normally in gripping contact with the periphery of said hub, said spring having one end attached to said chambered member; and means for expanding said spring and removing it from contact with said hub.

2. In a device of the class described, the combination of a driving shaft; a pulley secured thereto and provided with a cylindrical hub; a movable member having a chamber to receive said hub; a helical spring in said chamber and normally in gripping contact with the periphery of said hub, said spring having one end attached to said chambered member; a slidable member adapted to engage the free end of said spring; and means for operating said slidable member.

3. In a device of the class described, the combination of a driving shaft; a pulley secured thereto and provided with a cylindrical hub; a movable member having a chamber to receive said hub; a helical spring in said chamber and normally in gripping contact with the periphery of said hub, said spring having one end attached to said chambered member; a slidable member adapted to engage the free end of said spring; and treadle actuated mechanism for operating said slidable member.

4. In a device of the class described, the combination of a driving shaft; a pulley secured thereto and provided with a cylindrical hub; a movable member having a chamber to receive said hub; a helical spring in said chamber and normally in gripping contact with the periphery of said hub, said spring having one end attached to said chambered member; a slidable member carried by said movable member and adapted to engage the free end of said spring; and means for operating said slidable member.

5. In a device of the class described, the combination of a driving shaft; a pulley secured thereto and provided with a cylindrical hub; a movable member having a chamber to receive said hub; a helical spring in said chamber and normally in gripping contact with the periphery of said hub, said spring having one end attached to said chambered member; a headed pin slidably mounted in said movable member and adapted to engage the free end of said spring; a resilient member for moving said pin outwardly; and mechanism under the control of the operator for moving said pin inwardly.

6. In a device of the class described, the combination of a driving shaft; a pulley secured thereto and provided with a cylindrical hub; a movable member having a chamber to receive said hub; a helical spring in said chamber and normally in gripping contact with the periphery of said hub, said spring having one end attached to said chambered member; a pin slidably mounted in said chambered member with its inner end opposite the free end of said helical spring; a pivoted lever, one arm of which is adapted to engage with the outer end of said pin; resilient means for moving said pin outwardly; mechanism under the control of the operator for moving said lever about its pivot; and means coacting with the opposite end of said lever for regulating the movement of said pivoted lever.

7. In a device of the class described, the combination of a driving shaft; a pulley secured thereto and provided with a cylindrical hub; a movable member having a chamber to receive said hub; a helical spring in said chamber and normally in gripping contact with the periphery of said hub, said spring having one end attached to said chambered member; a pin slidably mounted in said chambered member with its inner end opposite the free end of said helical spring; a pivoted lever, one arm of which is adapted to engage with the outer end of said pin; resilient means for moving said pin outwardly; mechanism under the control of the operator for moving said lever about its pivot; and a revoluble cam coacting with the opposite end of said lever for regulating the movement of said pivoted lever.

8. In a device of the class described, the combination of a driving shaft; a pulley secured thereto and provided with a cylindrical hub; a movable member having a chamber to receive said hub; a helical spring in said chamber and normally in gripping contact with the periphery of said hub, said spring having one end attached to said chambered member; a pin slidably mounted in said chambered member with its inner end opposite the free end of said helical spring; a pivoted lever, one arm of which is adapted to engage with the outer end of said pin; resilient means for moving said pin outwardly; mechanism under the control of the operator for moving said lever about its pivot; means coacting with the opposite end of said lever for regulating the movement of said pivoted lever; and means for locking said lever to said cam at a predetermined point in its rotation.

9. In a device of the class described, the combination of a driving shaft; a pulley secured thereto and provided with a cylindrical hub; a movable member having a chamber to receive said hub; a helical spring in said chamber and normally in gripping contact with the periphery of said hub, said spring having one end attached to said chambered member; a pin slidably mounted in said chambered member with its inner end opposite the free end of said helical spring; a pivoted lever one arm of which is adapted to engage with the outer end of said pin; resilient means for moving said pin outwardly; mechanism under the control of the operator for moving said lever about its pivot; means coacting with the opposite end of said lever for regulating the movement of said pivoted lever; means for locking said lever to said cam at a predetermined point in its rotation; and a shock absorber coacting with said chambered member.

10. In a device of the class described, the combination of a driving shaft; a pulley secured thereto and provided with a cylindrical hub; a movable member having a chamber to receive said hub; a helical spring in said chamber and normally in gripping contact with the periphery of said hub, said spring having one end attached to said chambered member; a pin slidably mounted in said chambered member with its inner end opposite the free end of said helical spring; a pivoted lever, one arm of which is adapted to engage with the outer end of said pin; resilient means for moving said pin outwardly; mechanism under the control of the operator for moving said lever about its pivot; means coacting with the opposite end of said lever for regulating the movement of said pivoted lever; means for locking said lever to said cam at a predetermined point in its rotation; a piston pivotally connected to said chambered member; and a dash pot to receive said piston.

11. In a device of the class described, the combination of a driving shaft; a pulley secured thereto and provided with a cylindrical hub; a movable member having a chamber to receive said hub; a helical spring in said chamber and normally in gripping contact with the periphery of said hub, said spring having one end attached to said chambered member; a pin slidably mounted in said chambered member with its inner end opposite the free end of said helical spring; a pivoted lever, one arm of which is adapted to engage with the outer end of said pin; resilient means for moving said pin outwardly; mechanism under the control of the operator for moving said lever about its pivot; a revoluble cam secured to said shaft and provided with a peripheral recess; and a projecting member on the opposite end of said lever adapted to enter said recess and lock the cam member from further rotation.

12. In a device of the class described, the combination of a driving shaft; a pulley secured thereto and provided with a cylindrical hub; a movable member having a chamber to receive said hub; a helical spring in said chamber and normally in gripping contact with the periphery of said hub, said spring having one end attached to said chambered member; a pin slidably mounted in said chambered member with its inner end opposite the free end of said helical spring; a pivoted lever, one arm of which is adapted to engage with the outer end of said pin; resilient means for moving said pin outwardly; mechanism under the control of the operator for moving said lever about its pivot; a revoluble cam secured to said shaft and provided with a peripheral recess; and a projecting member pivoted to the opposite end of said lever adapted to enter said recess and lock the cam member from further rotation.

13. In a device of the class described, the combination of a driving shaft; a pulley secured thereto and provided with a cylindrical hub; a movable member having a chamber to receive said hub; a helical spring in said chamber and normally in gripping contact with the periphery of said hub, said spring having one end attached to said chambered member; a pin slidably mounted in said chambered member with its inner end opposite the free end of said helical spring; a pivoted lever, one arm of which is adapted to engage with the outer end of said pin; resilient means for moving said pin outwardly; mechanism under the control of the operator for moving said lever about its pivot; a revoluble cam secured to said shaft and provided with a peripheral recess; a projecting member on the opposite end of said lever adapted to enter said recess and lock the cam member from further rotation; and means for taking up the shock when the rotation of said cam member is stopped.

14. In a device of the class described, the combination of a driving shaft; a pulley secured thereto and provided with a cylindrical hub; a movable member having a chamber to receive said hub; a helical spring in said chamber and normally in gripping contact with the periphery of said hub, said spring having one end attached to said chambered member; a pin slidably mounted in said chambered member with its inner end opposite the free end of said helical spring; a pivoted lever, one arm of which is adapted to engage with the outer end of said pin; resilient means for moving said pin outwardly; mechanism under the control of the operator for moving said lever about its pivot; a revoluble cam secured to said shaft and provided with a peripheral recess and a depression; a projecting member on the opposite end of said lever adapted to enter said recess and lock the cam member from further rotation; and a roller on said lever coacting with said cam and adapted to enter said depression and permit said projecting member to enter said locking recess.

15. In a device of the class described, the combination of a driving shaft; a pulley secured thereto and provided with a cylindrical hub; a movable member having a chamber to receive said hub; a helical spring in said chamber and normally in gripping contact with the periphery of said hub, said spring having one end attached to said chambered member; a pin slidably mounted in said chambered member with its inner end opposite the free end of said helical spring; a pivoted lever one arm of which is adapted to engage with the outer end of said pin; resilient means for moving said pin outwardly; mechanism under the control of the operator for moving said lever about its pivot; a revoluble cam secured to said shaft and provided with a peripheral recess and a depression; a projecting member on the opposite end of said lever adapted to enter said recess and lock the cam member from further rotation; a roller on said lever coacting with said cam and adapted to enter said depression and permit said projecting member to enter said locking recess; and shock absorbing mechanism connected to said chambered member.

16. In a device of the class described, the combination of a driving shaft; a pulley secured thereto; a movable member on said shaft adjacent to said pulley; means interposed between said member and pulley normally gripping said pulley and preventing its rotation; mechanism carried by said member for releasing said gripping means; a pivoted lever for actuating said releasing mechanism; and means under the control of the operator for moving said lever about its pivot.

17. In a device of the class described, the combination of a driving shaft; a pulley secured thereto; a movable member on said shaft adjacent to said pulley; means interposed between said member and pulley normally gripping said pulley and preventing its rotation; mechanism carried by said member for releasing said gripping means; a pivoted lever for actuating said releasing mechanism; means under the control of the operator for moving said lever about its pivot; a revoluble cam member rotatable with said driving shaft and provided with a raised roller track having a depression therein at one point on its periphery, said cam member also having a locking recess opposite said depression; a roller on said lever adapted to travel on said raised track; and a locking projection carried by said lever adapted to enter said recess when said roller enters said depression.

18. In a device of the class described, the combination of a driving shaft; a pulley secured thereto; a movable member on said shaft adjacent to said pulley; means interposed between said member and pulley normally gripping said pulley and preventing its rotation; mechanism carried by said member for releasing said gripping means; a pivoted lever for actuating said releasing mechanism; means under the control of the operator for moving said lever about its pivot; a revoluble cam member rotatable with said driving shaft and provided with a raised roller track having a depression therein at one point on its periphery, said cam member also having a locking recess opposite said depression; a roller on said lever adapted to travel on said raised track; and a spring pressed member pivoted to said lever and provided with a locking projection adapted to enter said recess when said roller enters said depression.

19. In a device of the class described, the combination of a driving shaft; a pulley secured thereto; a movable member on said shaft adjacent to said pulley; means interposed between said member and pulley normally gripping said pulley and preventing its rotation; mechanism carried by said member for releasing said gripping means; a pivoted lever for actuating said releasing mechanism; means under the control of the operator for moving said lever about its pivot; a revoluble cam member rotatable with said driving shaft and provided with a raised roller track having a depression therein at one point on its periphery, said cam member also having a locking recess opposite said depression having undercut end walls; a roller on said lever adapted to travel on said raised track; and a locking projection carried by said lever adapted to enter said recess when said roller enters said depression, said projection having inclined end walls adapted to engage the undercut walls of said recess.

20. In a device of the class described, the combination of a driving shaft; a pulley secured thereto; a movable member on said shaft adjacent to said pulley; means interposed between said member and pulley normally gripping said pulley and preventing its rotation; mechanism carried by said member for releasing said gripping means; a pivoted lever for actuating said releasing mechanism; means under the control of the operator for moving said lever about its pivot; and a shock absorber connected to said movable member.

21. In a device of the class described, a driving member; means for normally gripping said member and preventing its rotation; mechanism under the control of the operator for releasing said gripping means, said mechanism including a member movable about the axis of said driving member; and yielding means independent of said gripping means for limiting the movement of said movable member.

22. In a device of the class described, a driving member; means for normally gripping said member and preventing its rotation; mechanism under the control of the operator for releasing said gripping means, said mechanism including a member movable about the axis of said driving member; a rod pivoted at one end to said movable member; a piston on the opposite end of said rod; and a dash pot in which said piston is adapted to reciprocate.

23. In a device of the class described, a driving member; means for normally gripping said member and preventing its rotation; mechanism under the control of the operator for releasing said gripping means, said mechanism including a member movable about the axis of said driving member; a rod pivoted at one end to said movable member; a piston on the opposite end of said rod; and a pivoted dash pot in which said piston is adapted to reciprocate.

Signed by me at 4 Post Office sq., Boston, Mass., this 11th day of September, 1916.

EDWARD ERICKSON.

Witnesses:
WALTER E. LOMBARD,
NATHAN C. LOMBARD.

Copies of this patent may be obtained for five cents each, by addressing the "Commissioner of Patents, Washington, D. C."